US006255005B1

(12) United States Patent
Yokoyama et al.

(10) Patent No.: US 6,255,005 B1
(45) Date of Patent: Jul. 3, 2001

(54) COMPOSITE MAGNETIC MEMBER, METHOD OF PRODUCING FERROMAGNETIC PORTION OF SAME, AND METHOD OF FORMING NON-MAGNETIC PORTION OF SAME

(75) Inventors: Shin-ichiro Yokoyama, Yasugi; Tsutomu Inui, Yonago; Hideya Yamada, Yasugi, all of (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/358,860

(22) Filed: Jul. 22, 1999

(30) Foreign Application Priority Data

Jul. 27, 1998 (JP) .......................................... 10-210531

(51) Int. Cl.[7] .......................................... B32B 15/00

(52) U.S. Cl. .......................... 428/683; 148/120; 148/121; 148/308; 148/309; 148/310; 335/296; 428/611; 428/638; 428/686; 428/900; 428/928

(58) Field of Search .................................... 428/611, 638, 428/683, 686, 900, 928; 148/120, 121, 308, 309, 310; 335/296

(56) References Cited

U.S. PATENT DOCUMENTS 5,841,212 11/1998 Mita et al. ........................... 310/156

FOREIGN PATENT DOCUMENTS 9-157802 6/1997 (JP) .
9-228004 9/1997 (JP) .
9-285050 10/1997 (JP) .

*Primary Examiner*—Deborah Jones
*Assistant Examiner*—Robert R. Koehler
(74) *Attorney, Agent, or Firm*—Sughrue, Mion, Zinn, Macpeak & Seas, PLLC

(57) ABSTRACT

Provided is a composite magnetic member made of a single material combining a ferromagnetic portion and a non-magnetic portion in which the ferromagnetic portion has better soft magnetism than conventional members and the non-magnetic portion has the same stable characteristic as conventional members. A method of producing the ferromagnetic portion of the member and a method of forming the non-magnetic portion are also provided. The composite magnetic member is made of an Fe—Cr—C-base alloy steel containing 0.1 to 5.0 weight % Al and has a ferromagnetic portion with a maximum magnetic permeability of not less than 400 and a non-magnetic portion with a magnetic permeability of not more than 2. In this member the number of carbides with a grain size of not less than 0.1 μm is regulated to not more than 50 in an area of 100 $\mu m^2$ and the proportion of the number of carbides with a grain size of not less than 1.0 μm to the number of all carbides is controlled to not less than 15%.

9 Claims, 7 Drawing Sheets

(X6000)

(×6000)

(×6000)

(×6000)

(×3000) 3.3 μm

COMPOSITE MAGNETIC MEMBER, METHOD OF PRODUCING FERROMAGNETIC PORTION OF SAME, AND METHOD OF FORMING NON-MAGNETIC PORTION OF SAME

BACKGROUND OF THE INVENTION

The present invention relates to a composite magnetic member combining a ferromagnetic portion and a non-magnetic portion in a single material, which member can be used in industrial products utilizing a magnetic circuit, such as a motor.

Industrial products requiring a magnetic circuit, such as the rotor of a motor and a magnetic scale etc., conventionally have a structure in which a non-magnetic portion is provided in a part of a ferromagnetic body (generally, a soft magnetic material). Techniques such as the brazing and laser welding of a ferromagnetic part and a non-magnetic part have been employed to provide a non-magnetic portion in a part of the ferromagnetic part. In contrast to these techniques of bonding dissimilar materials, the present inventors propose the use of a single material as the material for a composite magnetic member which is formed by providing a ferromagnetic portion and a non-magnetic portion by cold working or heat treatment. When such composite magnetic members made of a single material are used, it is possible to obtain parts superior to those obtained by bonding a ferromagnetic portion and a non-magnetic portion regarding the respects of ensuring airtightness, ensuring reliability, such as prevention of breakage by vibrations, etc., and reducing the cost thereof.

In JP-A-9-157802 based on the proposal by the present inventors, for example, a martensitic stainless steel containing 0.5 to 4.0% Ni is disclosed as a composite magnetic member suitable for an oil controlling device of an automobile. This proposal is such that in a martensitic stainless steel composed of ferrite and carbides in an annealed condition, by adding Ni of an appropriate amount in a Fe—Cr—C base alloy in which such a ferromagnetic characteristic as to be not less than 200 in maximum magnetic permeability, a non-magnetic portion having magnetic permeability not more than 2 is obtained and is stabilized in the martensitic stainless steel through the steps of heating the portion and then cooling it, and that the Ms point (at which the austenite begin to be changed to martensite) can be lowered to a temperature not more than −30° C.

Also, JP-A-9-228004 based on another proposal by the present applicant discloses that, by adding more than 2% but not more than 7% Mn and 0.01 to 0.05% N to a C—Cr—Fe-base alloy containing 10 to 16% Cr and 0.35 to 0.75% C and having ferromagnetic properties with a maximum magnetic permeability of not less than 200, there is obtained a composite magnetic material used in magnetic scales, etc., in which material a retained austenite with a magnetic permeability of not more than 2 is obtained and is stabilized by cooling after heating, and it becomes possible to lower the Ms point to not more than −10° C. These proposals are excellent in the respect that a ferromagnetic portion with a maximum magnetic permeability of not less than 200 and a stable non-magnetic portion with a magnetic permeability of not more than 2 and a low Ms point can be obtained in a single material.

The composite magnetic members disclosed in the above JP-A-9-157802 and JP-A-9-228004 are based on the proposal that a non-magnetic portion stable down to low temperatures can be formed in a part of a ferromagnetic body by adding an appropriate amount of Ni and Mn, which are austenite-forming elements, to a martensitic stainless steel from which ferromagnetic properties can be obtained, and by performing partial solution treatment, and it can be said that these composite magnetic members are excellent in the respect that a single material can combine a ferromagnetic portion with a maximum magnetic permeability ($\mu$m) of not less than 200 and a stable non-magnetic portion with a magnetic permeability ($\mu$) of not more than 2.

According to examinations by the present inventors, some of the composite magnetic members used as a magnetic circuit are required to have better soft magnetic properties (hereinafter referred to as soft magnetism) than those of conventional members, i.e., high maximum magnetic permeability and low coercive force, for example, as in the rotor of a motor. In contrast to this, in the above two proposals there were limits to the soft magnetism obtained in the ferromagnetic portion.

SUMMARY OF THE INVENTION

An object of the present invention is to obtain, by solving the above problems, a composite magnetic member combining a ferromagnetic portion and a non-magnetic portion in a single material, which ferromagnetic portion has better soft magnetism than conventional members and which non-magnetic portion has stable properties comparable to those of conventional members, a method of producing the ferromagnetic portion of this composite magnetic member, and a method of forming the non-magnetic portion.

According to the researches of the inventors, the microstructure of the ferromagnetic portion of the conventional composite magnetic member made of an Fe—Cr—C-base alloy steel is composed of ferrite matrix and carbides precipitated in this ferrite matrix. However, in order to obtain high maximum magnetic permeability, which is one of indices indicative of excellent soft magnetism, it is necessary to decrease precipitates in the member as little as possible and to thereby produce such a condition as domain walls are readily moved. When there are many carbides whose grain size is not less than 0.1 $\mu$m, in particular, there was a limit to the maximum magnetic permeability obtained in the ferromagnetic portion due to the carbides acting as obstacles to the movement of the domain walls.

Furthermore, in order to obtain low coercive force, which is another index indicative of excellent soft magnetism, it is effective to increase the size of crystal grains of the matrix.

However, when many carbides are present, the growth of the ferrite grains that form the matrix is suppressed and, therefore, the size of ferrite grains become very fine. This becomes the cause of impeding decrease in coercive force obtained in the ferromagnetic portion.

As a method of enhancing the soft magnetism in the ferromagnetic portion of the composite magnetic member, the present inventors discovered the addition of Al that had not been positively added as a ferrite-forming element. The composite magnetic member previously proposed by the present inventors in JP-A-9-157802 contains at least one kind selected from the group consisting of Si, Mn and Al as deoxidizers in an amount of not more than 2.0% in total.

In this proposal, the present inventors expected only the effect of the removal of the oxygen in molten steel by these elements of Si, Mn, Al, etc. as deoxidizers and considered that it is better if these elements do not remain in the member. According to their further examination, however, the present inventors found out that in a composite magnetic member made of an Fe—Cr—C-base alloy steel, the soft magnetism of the ferromagnetic portion is remarkably improved by positively adding Al to the alloy steel, which is used as a stock for producing the composite magnetic member, in amounts of 0.1 to 5.0%

Subsequently, the present inventors made an detailed research regarding the effect of the amount of Al added in the microstructure of the ferromagnetic portion. As a result, they found out that in the ferromagnetic portion having a microstructure mainly composed of ferrite and carbides irrespectively of the addition or non-addition of Al, when Al is added, the number of carbides per unit area decreases together with increase in the size of individual carbides and that the grain size of ferrite grains increases.

Next, the present inventors investigated the relationship between microstructure and soft magnetism. As a result, they found out that in the ferromagnetic portion mainly composed of ferrite and carbides, magnetic properties with a maximum magnetic permeability (μm) of not less than 400 can be realized by providing such a state as the number of carbides with a grain size of not less than 0.1 μm is not more than 50 in an area of 100 $\mu m^2$ and as the proportion of the number of carbides with a grain size of not less than 1.0 μm to the number of the former carbides is not less than 15%. Finding out further that magnetic properties with coercive force of not more than 1000 A/m can be realized by providing such a state as ferrite grains are made to be coarse grains having JIS grain size number not more than 14, the present inventors have reached the present invention.

In the present invention, there is provided a composite magnetic member made of an Fe—Cr—C-base alloy steel containing 0.1 to 5.0% Al, which member comprises a ferromagnetic portion with a maximum magnetic permeability of not less than 400 and a non-magnetic portion with a magnetic permeability of not more than 2. The above ferromagnetic portion is formed so that the number of carbides with a grain size of not less than 0.1 μm is not more than 50 in an area of 100 $\mu m^2$ and so that the proportion of the number of carbides with a grain size of not less than 1.0 μm to the number of the former carbides is not less than 15%.

In the present invention, there is also provided a composite magnetic member made of an Fe—Cr—C-base alloy steel containing 0.1 to 5.0% Al, which member comprises a ferromagnetic portion with coercive force of not more than 1000 A/m and a non-magnetic portion with a magnetic permeability of not more than 2. The above ferromagnetic portion is formed so that crystal grains are controlled to be coarse grains having Japanese Industrial Standard (JIS) grain size number not more than 14.

In the composite magnetic member of the present invention, the ferromagnetic portion preferably has an X-ray integrating intensity ratio of ferrite (200) to ferrite (110) of not less than 6 when the crystal orientation is measured with X-rays from the surface side. The ferromagnetic portion of the composite magnetic member more preferably has an electrical resistivity of not less than 0.7 μΩm.

The composite magnetic member of the present invention is made of an alloy steel with a nickel equivalent of 10.0 to 25.0% which Ni equivalent is defined by the formula, % Ni+30×% C+0.5×% Mn+30×% N, as a preferred chemical composition.

The composite magnetic member of the present invention is preferably made of an alloy steel having a chemical composition consisting essentially, by weight, of 0.30 to 0.80% C, 12.0 to 25.0% Cr, 0.1 to 5.0% Al, 0.1 to 4.0% Ni, 0.0 1 to 0.10% N, at least one kind not more than 2.0% in total selected from the group consisting of Si and Mn, and the balance Fe and incidental impurities. Furthermore, this composite magnetic member more preferably contains 0.3 to 3.5% Al by weight.

In the present invention, the method of producing the ferromagnetic portion of the composite magnetic member comprises the following steps. An Fe—Cr—C-base alloy steel containing 0.1 to 5.0% Al is first hot worked at a temperature not higher than 1100° C. The alloy steel is then annealed at least once at a temperature not higher than the A3 transformation point, and the ferromagnetic portion is formed in a manner that the number of carbides with a grain size of not less than 0.1 μm is regulated to not more than 50 in an area of 100 $\mu m^2$ and that the proportion of the number of carbides with a grain size of not less than 1.0 μm to the number of the former carbides is regulated to not less than 15%.

In the present invention, the method of forming the non-magnetic portion of the composite magnetic member comprises the following steps. An Fe—Cr—C-base alloy steel containing 0.1 to 5.0% Al is first hot worked at a temperature not higher than 1100° C. The alloy steel is then annealed at least once at a temperature not higher than the A3 transformation point so that a ferromagnetic portion is formed in which the number of carbides with a grain size of not less than 0.1 μm is regulated to be not more than 50 in an area of 100 $\mu m^2$ and so that the proportion of the number of carbides with a grain size of not less than 1.0 μm to the number of the former carbides is regulated to be not less than 15%. Then, a part of the above ferromagnetic portion is heated in the temperature range of from 1050° C. to the melting point and then cooled rapidly to form the non-magnetic portion.

DETAILED DESCRIPTION OF THE PREFERRED EMBODIMENTS

Figure 1:
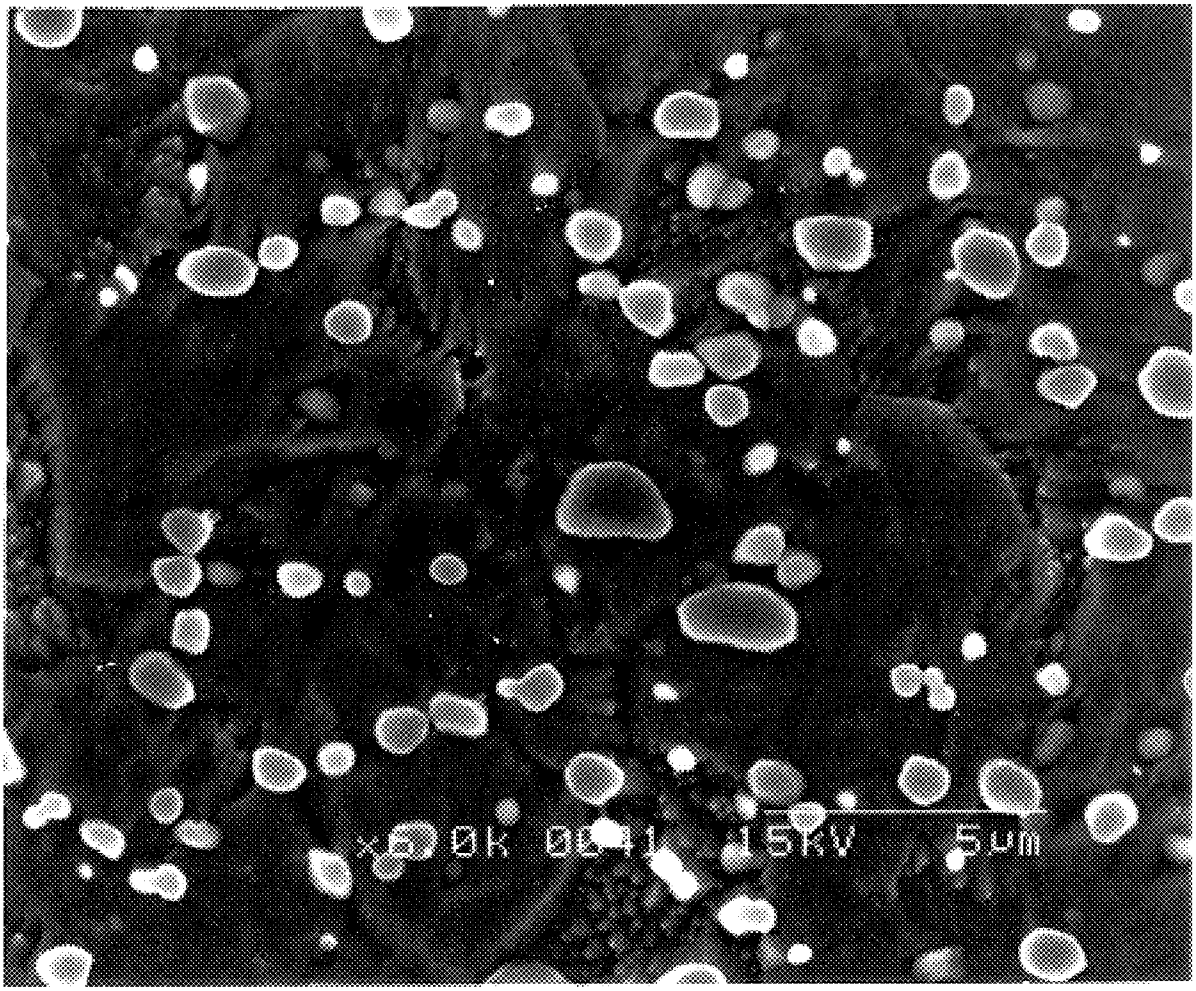
FIG. 1 is a photograph of the microstructure showing a morphology of carbides in the ferromagnetic portion in the composite magnetic member of the present invention.

As mentioned above, an important feature of the present invention is to positively add Al, which had thitherto been regarded as only an oxidizer, to an alloy steel that is used as the material for a composite magnetic member in order to enhance the soft magnetism of the ferromagnetic portion in the composite magnetic material.

In the ferromagnetic portion in the composite magnetic member made of an Fe—Cr—C-base alloy steel, the addition of this Al for the first time has enabled that each of the number of carbides with a grain size of not less than 0.1 μm, the proportion of the number of carbides with a grain size of not less than 1.0 μm to the number of the above carbides, and the grain size and crystal orientation of ferrite grains is regulated to a particular range, with the result that excellent soft magnetism was obtained. Thus, Al is the most important element in the present invention which is added to the alloy material to improve soft magnetism in the ferromagnetic portion of the composite magnetic member.

The effects of the addition of Al to the alloy steel that is used as the material for the composite magnetic member are described in detail below.

First, the present inventors have for the first time found out that among the various elements added to an Fe—Cr—C-base alloy, which is used as the material for the composite magnetic component, Al combines the effect of causing individual carbides to grow, the effect of reducing the number of carbides, and the effect of increasing the grain size of ferrite matrix, thus remarkably improving the magnetic properties of the ferromagnetic portion.

As shown in FIG. 4, the present inventors have ascertained by a surface analysis of EDX that in the ferromagnetic portion, Al is present in the ferrite of the matrix, not in the carbides.

However, there is still uncertainty about reasons for the metallographic changes caused by Al addition, that is, about the mechanism for the increase in the size of carbides through the presence of Al in the matrix, about whether ferrite grains become coarse because in the addition of Al the size of carbides increases and because the number of carbides decreases or inversely, the size of carbides increases and the number of carbides decreases because ferrite grains become coarse, and the like. Therefore, the present inventors are currently elucidating these metallographic changes.

Next, a relationship between the amount of added Al and the morphology of carbides and maximum magnetic permeability in the ferromagnetic portion is specifically described.

A composite magnetic member made of an alloy steel containing Fe-17.5% Cr-0.5% C-2.0% Ni by weight as the principal components is taken as an example among those used in the experiment carried out by the present inventors. When Al is contained as a deoxidizer in an amount of 0.02% only and is not substantially added, in the ferromagnetic portion the number of carbides with a grain size of not less than 0.1 μm is 62 in an area of 100 $\mu m^2$, and regarding this 62 carbides, the number of carbides with a grain size of not less than 1.0 μm is 8 which is about 13% of the total number of the carbides measured. In this case, the maximum magnetic permeability is 320.

In the ferromagnetic portion of the composite magnetic member made of an alloy steel obtained by adding 0.47% Al by weight to the above alloy steel, the number of carbides with a grain size of not less than 0.1 μm is 44 in an area of 100 $\mu m^2$, and regarding this 44, the number of carbides with a grain size of not less than 1.0 μm is 8 which is about 18% of the total number of the carbides measured. In this case, the maximum magnetic permeability increases to 824.

In the ferromagnetic portion of a composite magnetic member made of an alloy steel obtained by further adding 0.96% Al by weight, the number of carbides with a grain size of not less than 0.1 μm is 30 in an area of 100 $\mu m^2$, which 30 pieces are about half the number obtained when Al is not substantially added. Regarding this 30, the number of carbides with a grain size of not less than 1.0 μm is 8 which is about 27% of the total number of the carbides measured. In this case, the maximum magnetic permeability increases to 952.

Thus, it is apparent that the addition of Al decreases the number of carbides with a grain size of not less than 0.1 μm and increases the proportion of the number of carbides with a grain size of not less than 1.0 μm to the total number of the carbides measured. In addition, it becomes apparent that high maximum magnetic permeability is obtained in association with this metallographic change.

The foregoing is the first effect of the addition of Al to an Fe—Cr—C-base alloy steel that is used as the material for the composite magnetic member.

Next, a relationship between the amount of added Al and the grain size and coercive force of ferrite grains in the ferromagnetic portion is specifically described below.

A composite magnetic member made of an alloy steel containing Fe-17.5% Cr-0.5% C-2.0% Ni by weight as the principal components is taken as an example. When Al is contained as a deoxidizer in an amount of 0.02% only and is not substantially added, in the ferromagnetic portion the size of ferrite grains is 16.0 in terms of JIS grain size number and coercive force is 1220 A/m.

In the ferromagnetic portion of a composite magnetic member made of an alloy steel obtained by adding 0.96% Al by weight to the above alloy steel, the size of ferrite grains increases to 13.5 in terms of grain size number and coercive force decreases to 540 A/m. Thus, soft magnetic (soft magnetic characteristic) can be improved.

In the ferromagnetic portion of a composite magnetic member made of an alloy steel obtained by further adding 1.48% Al by weight, the size of ferrite grains increases to 12.0 in terms of JIS grain size number and coercive force decreases to 460 A/m. Thus, soft magnetism (soft magnetic characteristic) can be further improved. It is apparent that the addition of Al increases the size of ferrite grains and decreases coercive force in association with this, resulting in an improvement in soft magnetic (soft magnetic characteristic).

The foregoing is a second effect of the addition of Al to an Fe—Cr—C-base alloy steel that is used as the material for the composite magnetic member.

When a composite magnetic member is used as a component of a magnetic circuit, it is often required that the residual magnetic flux density of the ferromagnetic portion be high and that an angulated shape of a hysteresis loop be good.

The fact that the square angulated of a hysteresis loop is good means that the magnetic loss of a material is small and that an on-off characteristic, i.e., magnetic responsibility is good when positive and negative magnetic fields are continuously applied. It is generally known that the angulated shape of a hysteresis loop is related to the crystal orientation of a magnetic material.

The present inventors have found out that by adding Al to an Fe—Cr—C-base alloy, which is used as the material for a composite magnetic member, it is possible to regulate the crystal orientation of ferrite grains, which are the matrix of the ferromagnetic portion, and that there is a close relationship between crystal orientation and residual magnetic flux density.

More specifically, when an Fe—Cr—C-base alloy steel is used as the material, there is good agreement between the effect of Al addition on a change in the integrating intensity of ferrite phase (200) when crystal orientation is measured with X-rays from the side of rolling plane which is the surface side and the effect of Al addition on a change in residual magnetic flux density. In other words, when the intensity of (200) as viewed from the surface side is increased by adding Al, the residual magnetic flux density can also be increased.

Incidentally, the mechanism of controlling crystal orientations by Al addition is unknown and the present inventors are currently elucidating it.

The relationship between the amount of added Al and the crystal orientation of ferrite grains and the residual magnetic flux density in the ferromagnetic portion is specifically described below.

The crystal orientation in this case is determined by measuring the integrating intensity ratio of the (110), (200) and (211) of ferrite on the side of rolling plane, which is the surface side measured by X-ray diffraction.

A composite magnetic member made of an alloy steel containing Fe-17.5% Cr-0.5% C-2.0% Ni by weight as the principal components is taken as an example. When Al is contained as a deoxidizer in an amount of 0.02% only and is not substantially added, the crystal orientation of ferrite grains in the ferromagnetic portion is such that (110), (200) and (211) are 8.3%, 38.7% and 52.5%, respectively, and the integrating intensity ratio of (200) to (110), i.e., (200)/(110) is 4.4. In this case, the remanent magnetic flux density is 0.78T.

In the ferromagnetic portion of a composite magnetic member made of an alloy steel obtained by adding 0.47% Al by weight to the above alloy steel, the crystal orientation of ferrite grains is such that (110), (200) and (211) are 6.9%, 49.5% and 43.6%, respectively, and the value of (200)/(110) is 7.2. In this case, the residual magnetic flux density increases up to 1.03T.

In the ferromagnetic portion of a composite magnetic member made of an alloy steel obtained by further adding 0.96% Al by weight, the crystal orientation of ferrite grains is such that (110), (200) and (211) are 7.4%, 47.0% and 45.5%, respectively, and the value of (200)/(110) is 6.4. In this case, the residual magnetic flux density is 1.03T.

Thus, it is apparent that the addition of Al causes the crystal orientation of ferrite grains to coincide with the direction in which (200)/(110) increases, when the crystal orientation is measured from the rolling plane which is the surface side. It is apparent that the residual magnetic flux density increases in association with this change.

The foregoing is the third effect of the addition of Al to an Fe—Cr—C-base alloy steel that is used as the material for a composite magnetic member.

Incidentally, in a case where the surface measured by X-ray diffraction has a curved shape, it is advisable to measure the surface worked flat by a rolling roll, which provides the surface side.

In addition to the above effects, Al addition has another effect not only in the aspect of the soft magnetism of the ferromagnetic portion, but also from the viewpoint of an increase in the electrical resistivity of the ferromagnetic portion; that is, when a soft magnetic material is used in an AC magnetic field, eddy-current loss can be reduced if the electrical resistivity of the material is increased, so that magnetic responsibility can be improved. This is a fourth effect of the addition of Al to an Fe—Cr—C-base alloy steel that is used as the material for the composite magnetic member.

The reasons for the limited numerical values in the present invention are described below.

First, the reason why the amount of Al added to an Fe—Cr—C-base alloy steel, which is used as the material for a composite magnetic member, is limited to the range of 0.1 to 5.0% by weight is described.

As mentioned above, Al is the most important element of the present invention that changes the microstructure of the ferromagnetic portion, such as morphology of carbides, grain size and crystal orientation, resulting in a remarkable improvement in the soft magnetism of the ferromagnetic portion.

The reason why the amount of added Al is limited to the range of not less than 0.1% but not more than 5.0% is that the effect of improving soft magnetism by changing the microstructure of the ferromagnetic portion is small if the Al content is less than 0.1% and that inversely, if it exceeds 5.0%, the magnetic permeability of the non-magnetic portion increases and besides workability deteriorates, making it difficult to produce a composite magnetic member.

When the Al content is controlled to the range of 0.3 to 3.5%, the above effects of Al addition become more remarkable. This is especially preferable.

In a more preferred range of Al content, the lower limit is 0.5% and the upper limit is 1.5%.

Next, the reasons for the limited grain size and number of carbides in the ferromagnetic portion and the proportion of the number of carbides with a grain size of not less than 1.0 μm to the total number of carbides measured are described.

The reason why only carbides with a grain size of not less than 0.1 μm are counted is that it is difficult to observe carbides with a grain size of less than 0.1 μm and that carbides with a grain size of less than 0.1 μm do not prevent the movement of domain walls, having little effect on soft magnetism.

Also, the reason why the number of carbides with a grain size of not less than 0.1 μm is limited to be not more than 50 in a area of 100 $\mu m^2$ and why the proportion of the number of carbides with a grain size of not less than 1.0 μm to the total number of the carbides measured is limited to be not less than 15% is described below. This is because, as is apparent from the above experiment results, the domain-wall movement is made easy by controlling the morphology of carbides to this range, with the result that a maximum magnetic permeability of not less than 400 can be easily obtained in the ferromagnetic portion.

Next, the reasons for limiting the maximum magnetic permeability of ferromagnetic portion and magnetic permeability of non-magnetic portion are described.

Because the member of the present invention is a composite magnetic member, both of the soft magnetic and non-magnetic properties must be provided in one member.

The reason why the maximum magnetic permeability of the ferromagnetic portion is limited to be not less than 400 is that it is ensured that the composite magnetic member can be adequately used in applications requiring high maximum magnetic permeability such as motor parts. The more preferred range of maximum magnetic permeability of the ferromagnetic portion is not less than 700.

The reason why the magnetic permeability of the non-magnetic portion is limited to not more than 2 is that magnetic flux flows easily when this range is exceeded, with the result that the non-magnetic portion becomes unsuitable for applications requiring non-magnetic properties. The more preferred magnetic permeability of the non-magnetic portion is not more than 1.1.

Next, the reasons for the limited ranges of ferrite grain size and coercive force of the matrix of the ferromagnetic portion is described. More specifically, the reason why the size of ferrite grains is limited to be coarse grains having Japanese Industrial Standard (JIS) grain size number not more than 14 and the reason why the coercive force of the ferromagnetic portion is limited to be not more than 1000 A/m are as follows. The JIS grain size number 14 correspond to ASTM Micro-Grain Size Number 10.3 prescribed in ASTM E112 and means an average diameter of 9.85 $\mu$m. Ferrite grain size and coercive force are mutually related characteristics. When ferrite grains are controlled to be coarse grains having JIS grain size number not more than 14, a characteristic with coercive force of not more than 1000 A/m can be easily obtained. By obtaining this characteristic with coercive force of not more than 1000 A/m, it is possible to use the ferromagnetic portion in applications requiring small coercive force for soft magnetism as in the case of core parts.

The reasons for limiting the crystal orientation and residual magnetic flux density of the ferromagnetic portion as preferred ranges are described below. When a rolled steel sheet is used as the material for the member of the present invention, the following is the reason why the crystal orientation of the ferromagnetic portion is such that the X-ray integrating density ratio of ferrite (200) to ferrite (110) is not less than 6 as viewed from the rolling plane which becomes the surface, and the reason why the residual magnetic flux density of the ferromagnetic portion is limited to not less than 1.0 T. The crystal orientation of ferrite grains and residual magnetic flux density are correlated characteristics. Therefore, when the crystal orientation of ferrite grains is controlled so that the X-ray integrating density ratio of ferrite (200) to ferrite (110) is not less than 6, a characteristic with residual magnetic flux density of not less than 1.0 T can be easily obtained. By obtaining this characteristic with residual magnetic flux density of not less than 1.0 T, it is possible to use the ferromagnetic portion in applications requiring an excellent on/off characteristic in response to applied magnetic fields, i.e., magnetic responsibility.

Next, the reason for limiting the electrical resistivity of the ferromagnetic portion as a preferred range is described below.

The reason why the electrical resistivity of the ferromagnetic portion is limited to be not less than 0.7 $\mu\Omega$m is as follows. When a composite magnetic member is used in an AC magnetic field, it is ensured that the member can be adequately used in applications requiring quick responsibility in a magnetic circuit by reducing magnetic losses due to eddy currents.

The reason for the limited nickel equivalent of an alloy steel that is used as the material is described below.

As mentioned above, in the member of the present invention, the soft magnetism of the ferromagnetic portion is superior to that hitherto disclosed. In order to obtain a stable non-magnetic portion in the member of the present invention, it is necessary to use such an element as to have a function for stabilizing austenite which is a non-magnetic structure, during the treatment for obtaining the non-magnetic portion. The essential elements of the material for the member of the present invention are the four elements of Al, Fe, Cr and C, and only C has the above function. Therefore, when the characteristic of the non-magnetic portion is to be further stabilized by decreasing the magnetic permeability of the non-magnetic portion, it is desirable to add austenite-forming elements such as Ni, Mn and N in an amount of 10.0 to 25.0% in terms of nickel equivalent (=% Ni+30×% C+0.5×% Mn+30×% N).

The reason why the lower limit of nickel equivalent is limited to 10.0% is that it is difficult to obtain a non-magnetic portion with a magnetic permeability of not more than 2 when the nickel equivalent is less than 10.0%. The reason why the upper limit of nickel equivalent is limited to 25.0% is that the soft magnetism of the ferromagnetic portion deteriorates in a range exceeding 25.0%, making it difficult to obtain a characteristic with a maximum magnetic permeability of not less than 400.

The reasons for the limited contents of elements other than Al in an alloy steel which is used as the material for the composite magnetic member, as more preferred ranges are described below.

As mentioned above, C is an essential element of the present invention effective in the formation of the non-magnetic portion as an austenite-forming element. In addition, the addition of C is also effective in ensuring the strength of the member. If the C content is less than 0.30%, it is difficult to obtain a stable non-magnetic austenite structure when the material is cooled after heating to a temperature not less than the austenite transformation temperature. On the other hand, if it exceeds 0.80%, the number of carbides in the ferromagnetic portion of the composite magnetic member becomes too large, making it difficult to meet the requirements for the morphology of carbides in the present invention. If the material becomes too hard, workability also becomes deteriorated. In the present invention, therefore, the C content is limited to the range of 0.30 to 0.80%. The more preferred range of C content is 0.45 to 0.65%.

Cr is an essential element of the present invention that exists in the matrix in the solid solution state and partially becomes carbides in the ferromagnetic portion, ensuring the mechanical strength and corrosion resistance of the composite magnetic member. The reason why the Cr content is limited to the range of 12.0 to 25.0% is that corrosion resistance is deteriorated with Cr contents of less than 12.0% and the soft magnetism of the ferromagnetic portion deteriorates in the range exceeding 25.0% although corrosion resistance is excellent. The more preferred range of Cr content is 16.0 to 20.0%.

Ni is an element effective in the formation of the non-magnetic portion as an austenite-forming element. The reason why the Ni content is limited to the range of 0.1 to 4.0% is that it is difficult to obtain a stable non-magnetic portion with Ni contents of less than 0.1% and a good soft magnetic property and workability cannot be easily obtained with Ni contents exceeding 4.0%.

N is an element having an effect similar to Ni as an austenite-forming element. The reason why the N content is limited to the range of 0.01 to 0.10% is that it is difficult to obtain a stable non-magnetic portion with N contents of less than 0.01% and the material becomes too hard in hardness and formability deteriorates when it exceeds 0.10%.

Incidentally, an alloy steel used as the material for the composite magnetic member of the present invention may contain at least one kind selected from the group consisting of Si and Mn as deoxidizers in an amount of not more than 2.0%. Si is an element having a function similar to that of Al and is effective to enhance the soft magnetism of the ferromagnetic portion in addition to the function of deoxidizer. Thus, the above content of Si may be contained which content does not deteriorate the workability of the alloy steel. Mn is also effective to form austenite like C, Ni, N, etc. Furthermore, the alloy steel may contain P, S and O as incidental impurities in an amount of not more than 0.1% each which does not deteriorates the magnetic properties in particular.

Next, the reason for the limited manufacturing process of the present invention is described below.

In the present invention, the hot working temperature for an Fe—Cr—C-base alloy steel containing an appropriate amount of Al, which is used as the material for the composite magnetic material, is limited to be not ore than 1100° C.

If hot working is performed at a temperature exceeding 1100° C., the amount of C that exists in the matrix of the alloy steel in the solid solution state become too much and the grains of carbides that precipitate become very fine in size. As a consequence, it is impossible to sufficiently increase the size of individual carbides that precipitate even through annealing at a temperature not higher than the A3 transformation point after hot working. Furthermore, because the C existing in the matrix in the solid solution state during hot working precipitates again during annealing as new fine-grained carbides, it is difficult to control the morphology of carbides to the range recited in the claims.

It is necessary that the nuclei of carbides remain during hot working in order to ensure that the number of carbides with a grain size of not less than 0.1 μm is not more than 50 in an area of 100 $\mu m^2$ and that the proportion of the number of carbides with a grain size of not less than 1.0 μm to the number of the above carbides is not less than 15%. For this reason, the maximum temperature at which the nuclei of carbides can be left is limited to be 1100° C.

Hot working is preferably performed at a temperature in the range of 900 to 1100° C.

The temperature of the annealing performed after hot working is limited to be a temperature not higher than the A3 transformation temperature.

The A3 transformation temperature is a temperature above which a structure composed of ferrite and carbides begins to occur and below which the austenite structure begins to occur. In the present invention, the A3 transformation point is about 830° C., for example, in the case of an Fe-17.5% Cr-0.5% C-1.0% Al-2.0% Ni-0.02% N alloy. Because the magnetic properties of the ferromagnetic portion are based on the ferrite structure which has soft magnetism, it is undesirable that the annealing temperature exceed the A3 transformation point.

The reason why annealing is performed at least once in this temperature range is that working strains of ferrite phase are relieved and, at the same time, the size of the carbides that were nuclei during working is increased, whereby the morphology of carbides is regulated to the range recited in the claims. Incidentally, in the member of the present invention, annealing at a temperature not higher than the A3 transformation point may be performed at least twice as required. By performing annealing a plurality of times, the effect of further increasing the size of carbides obtained by performing annealing once and the effect of reducing the number of carbides are further enhanced.

In the member of the present invention, after hot working and at least one annealing operation at a temperature not higher than the A3 transformation point, cold working may be performed as required and annealing at a temperature not higher than the A3 transformation point may be performed after cold working.

This is because steel sheets annealed after cold rolling or cold drawing are often used in the case of general soft magnetic materials and it can be thought that the same applies to the composite magnetic member of the present invention. The annealing after cold working may be performed a plurality of times as with the annealing after hot working. Furthermore, the process of cold working and annealing may be repeated a plurality of times. There is no substantial difference in the soft magnetism of the ferromagnetic portion between a case where annealing is performed after hot working and another case where annealing is performed after cold working.

In the present invention, as a method of providing a non-magnetic portion in a part of an alloy steel which is made to be ferromagnetic by the above process, it is preferable to employ a method comprising the steps of heating a part of the member by high-frequency heating to a temperature not lower than the austenitizing temperature so that solution treatment may be applied to the part and then rapidly cooling it or another method comprising the steps of heating a part of the member to a melting temperature by $CO_2$ laser, etc. and then rapidly cooling it. The heating temperature for these treatments for providing a non-magnetic portion is in the range from 1050° C., at which the austenite structure is obtained after cooling, to a melting temperature, and preferably in the temperature range from 1150° C. to the melting temperature.

The reason why the lower limit of the heating temperature is 1050° C. is that this temperature is a minimum temperature necessary for obtaining the austenite structure after heating and cooling and thereby obtaining a non-magnetic portion with a magnetic permeability of not more than 2. The reason why the more preferred minimum temperature is 1150° C. is that a further stable non-magnetic portion can be obtained when the heating temperature is not less than 1150° C.

The reason why the maximum temperature is limited to be a melting temperature is that a non-magnetic portion with a magnetic permeability of not more than 2, which is substantially composed of the austenite structure, can be obtained not only by the solution treatment including heating and cooling, but also by a method having the steps of melting and solidifying at a further higher temperature. When a laser beam is used as the source of heating, this technique for providing the non-magnetic portion by the melting and solidifying provides an especially effective means.

A non-magnetic portion that is essentially composed of the austenite structure can be obtained by adopting the above technique that includes heating, solution treatment and rapid cooling or the technique that include heating, melting and rapid cooling. In this case, the structure that is substantially composed of austenite means that a little amount of martensite, which is formed during rapid cooling when solution treatment is performed at a relatively low temperature, may be contained in the structure. Specifically, when the amount of martensite in the structure is not more than 10%, the properties of non-magnetic portion do not fall outside of the magnetic permeability range not more than 2 which is the characteristic necessary for the non-magnetic portion of the composite magnetic member. Thus, there is no problem in this respect.

The composite magnetic member of the present invention can be obtained by performing the above manufacturing process.

EXAMPLE 1

In the present invention, the first important factors are the amount of Al added to an Fe—Cr—C-base alloy, which is the material for a composite magnetic material, and the microstructure of the ferromagnetic portion, such as the morphology of carbides, grain size and crystal orientation, and the second important factor is the magnetic properties of the ferromagnetic portion, such as the maximum magnetic permeability, coercive force and residual magnetic flux density.

Next, the magnetic permeability of the non-magnetic portion of a composite magnetic member and the nickel equivalent for regulating the magnetic permeability are also important.

In order to clarify the effect of Al addition regarding the microstructure and soft magnetism of the ferromagnetic portion and the relationship between the nickel equivalent and the magnetic permeability of the non-magnetic portion, alloy steel ingots with varied contents of elements of Al, C and Ni were made as starting alloy materials by vacuum melting.

Table 1 shows the chemical compositions and nickel equivalents (=% Ni+30×% C+0.5×% Mn+30×% N) of the alloy steels that are used as the starting materials for the composite magnetic member.

The materials for the members Nos. 1 to 7, No. 13 and No. 14 are alloy steels in which the added amounts of C, Si, Mn, Ni, Cr, etc. are almost the same and the amount of added Al is varied. The material for member No. 8 is alloy steel in which Si content is high. The materials for the member No. 3 and members Nos. 9 to 12 are alloy steels in which the amounts of added Si, Mn, Ni, Cr, Al, etc. are almost the same and the amount of C is varied.

In the member No. 15, both the C and Ni contents are lowered, thereby lowering the nickel equivalent.

In the member No. 16, both the C and Ni contents are raised, thereby raising the nickel equivalent.

TABLE 1

| No. | C | Si | Mn | P | S | Ni | Cr | Al | N | O | Fe | (weight %) Ni Equivalent (= %Ni + 30X% C + 0.5X% Nn + 30X% N) |
|---|---|---|---|---|---|---|---|---|---|---|---|---|
| 1 | 0.50 | 0.18 | 0.46 | 0.004 | 0.001 | 2.00 | 17.70 | 0.12 | 0.022 | 0.006 | the balance | 17.89 |
| 2 | 0.50 | 0.19 | 0.47 | 0.004 | 0.001 | 2.00 | 17.76 | 0.47 | 0.022 | 0.003 | the balance | 17.90 |
| 3 | 0.51 | 0.19 | 0.47 | 0.003 | 0.001 | 2.00 | 17.76 | 0.96 | 0.023 | 0.002 | the balance | 18.23 |
| 4 | 0.51 | 0.20 | 0.47 | 0.003 | 0.001 | 1.99 | 17.76 | 1.48 | 0.021 | 0.003 | the balance | 18.16 |
| 5 | 0.51 | 0.20 | 0.49 | 0.003 | 0.001 | 2.00 | 17.67 | 1.91 | 0.022 | 0.001 | the balance | 18.21 |
| 6 | 0.51 | 0.19 | 0.51 | 0.003 | 0.001 | 1.98 | 17.76 | 2.38 | 0.022 | 0.001 | the balance | 18.20 |
| 7 | 0.51 | 0.19 | 0.51 | 0.003 | 0.001 | 2.00 | 17.70 | 4.68 | 0.022 | 0.001 | the balance | 18.22 |
| 8 | 0.50 | 1.46 | 0.47 | 0.002 | 0.001 | 1.99 | 17.52 | 0.98 | 0.020 | 0.005 | the balance | 17.83 |
| 9 | 0.22 | 0.19 | 0.53 | 0.001 | 0.001 | 2.02 | 17.72 | 1.03 | 0.022 | 0.003 | the balance | 9.55 |
| 10 | 0.31 | 0.19 | 0.54 | 0.001 | 0.001 | 1.98 | 17.82 | 1.05 | 0.022 | 0.005 | the balance | 12.21 |
| 11 | 0.63 | 0.21 | 0.50 | 0.001 | 0.001 | 2.00 | 17.74 | 1.03 | 0.021 | 0.004 | the balance | 21.78 |
| 12 | 0.72 | 0.19 | 0.49 | 0.001 | 0.001 | 1.94 | 17.74 | 1.01 | 0.022 | 0.005 | the balance | 24.45 |
| 13 | 0.55 | 0.19 | 0.47 | 0.002 | 0.001 | 1.99 | 17.82 | 0.02 | 0.020 | 0.005 | the balance | 19.33 |
| 14 | 0.51 | 0.19 | 0.51 | 0.003 | 0.001 | 2.00 | 17.70 | 5.20 | 0.022 | 0.001 | the balance | 18.22 |
| 15 | 0.11 | 0.20 | 0.49 | 0.003 | 0.001 | 1.01 | 17.66 | 1.02 | 0.021 | 0.002 | the balance | 5.19 |
| 16 | 0.80 | 0.19 | 0.51 | 0.001 | 0.001 | 4.01 | 17.75 | 1.06 | 0.021 | 0.005 | the balance | 28.90 |

The alloy steel ingots obtained were heated to 1000° C. and forged to produce 20 mm thick plates. After that, the plates were again heated to 1000° C. and 5.0 mm thick rolled plates were obtained by hot rolling. The hot-rolled plates were annealed at 780° C. not higher than the A3 transformation temperature and 1.0 mm thick cold-rolled plates were obtained by performing cold rolling. The cold-rolled plates were again annealed at 780° C. not higher than the A3 transformation temperature and soft magnetism materials were produced.

A part of each of the steel plates that became soft magnetism materials was heated by high-frequency heating and held at about 1200° C. for 10 minutes. After that, this steel plate was partially made to be non-magnetic by water cooling. The alloy steel plate thus obtained by performing the treatment for obtaining a non-magnetic portion was used as the composite magnetic member.

To examine the number of carbides in the ferromagnetic portion, samples for microscopic observation were obtained by cutting from the part of ferromagnetic portion not affected by the heat of high-frequency heating. These samples were mirror-polished after embedding resin so that the longitudinal section defined by the rolling may become the surface to be observed, and then chemical etching was performed by the use of aqua regia. These chemically etched samples were observed with a scanning electron microscope in 10 fields of a magnification of 6000 and photographed.

Figure 2:
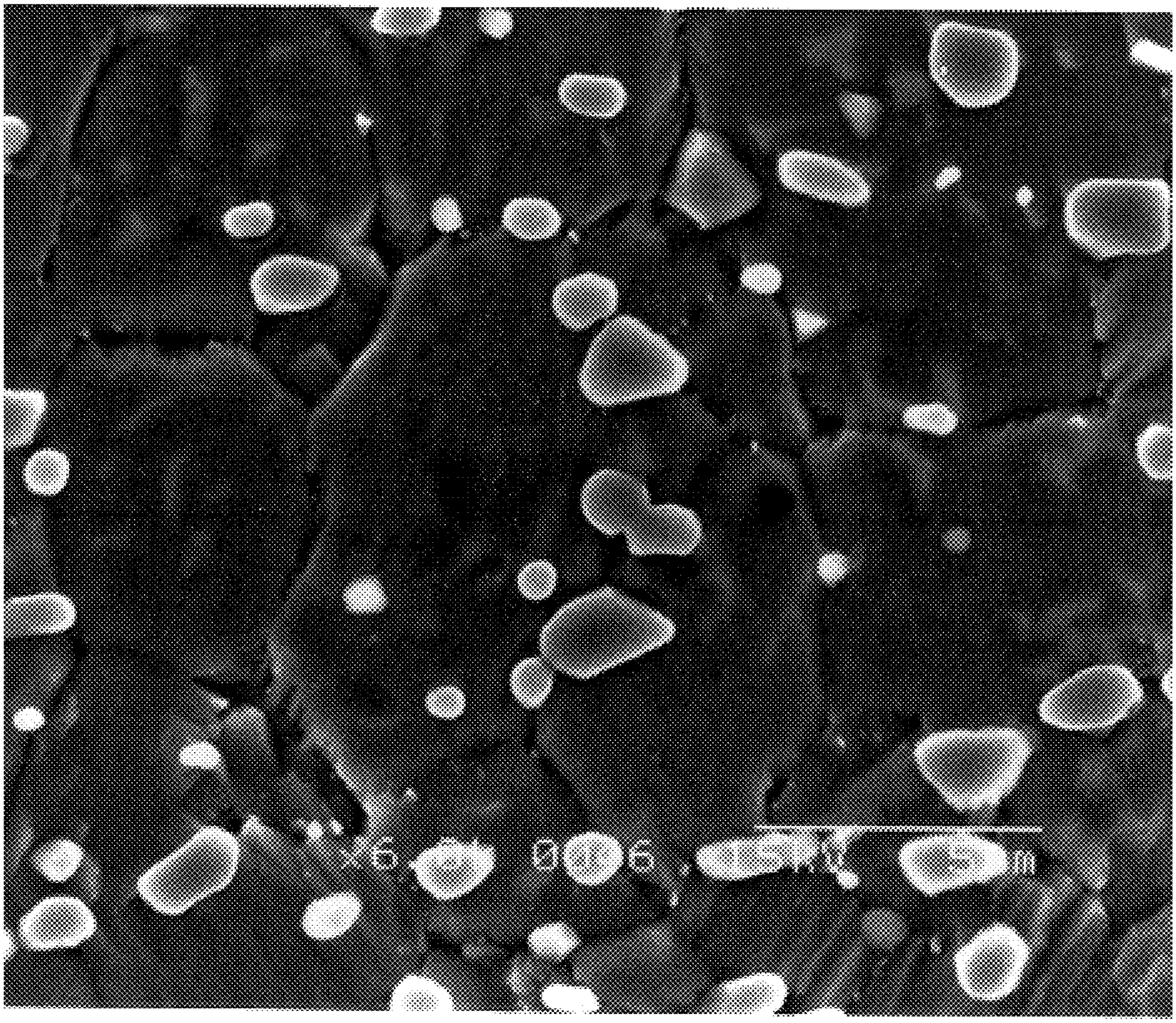
FIG. 2 is a photograph of the microstructure showing a morphology of carbides in the ferromagnetic portion in the composite magnetic member of the present invention.
Figure 3:
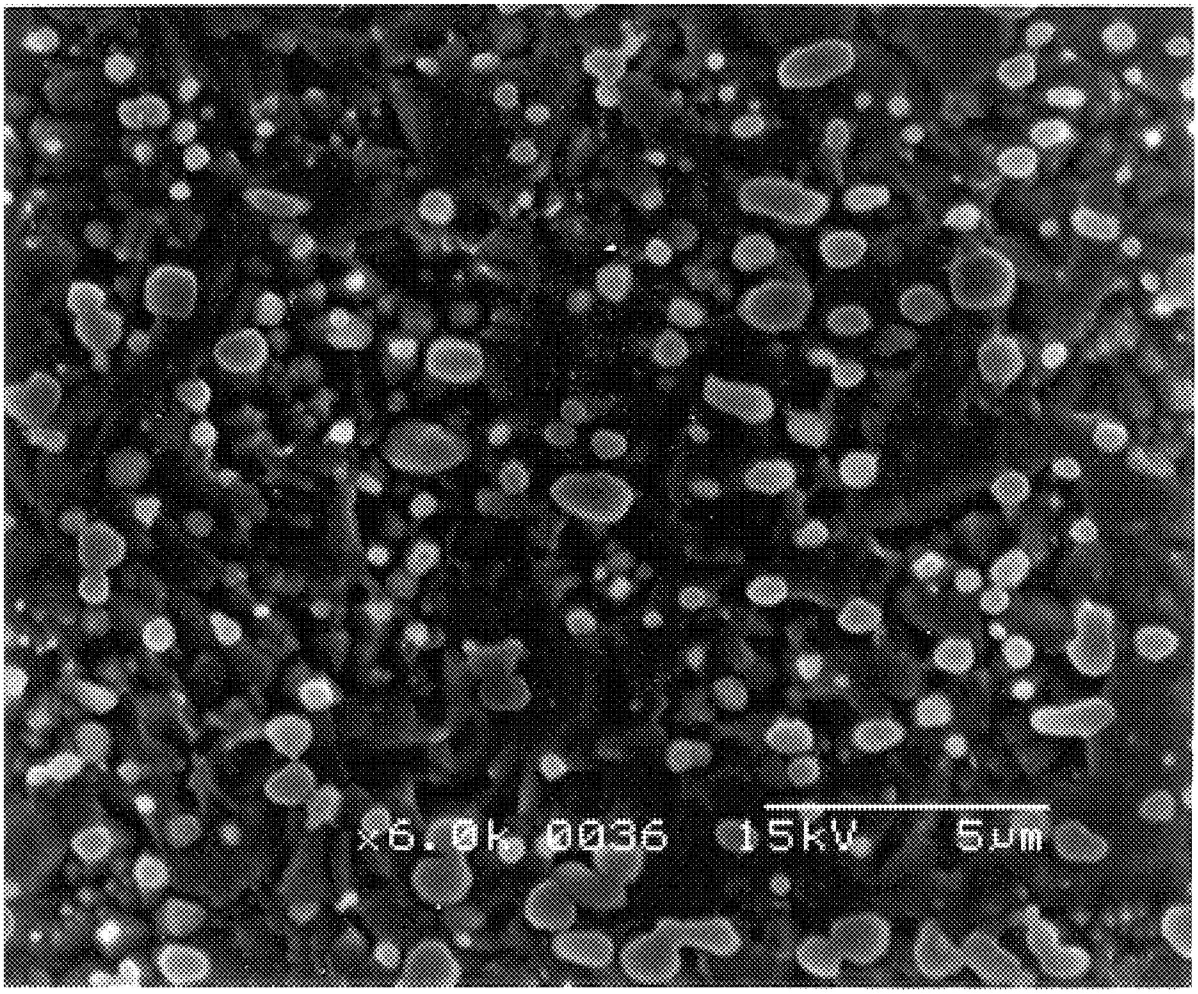
FIG. 3 is a photograph of the microstructure showing a morphology of carbides in the ferromagnetic portion as a comparative example.
Figure 4A:
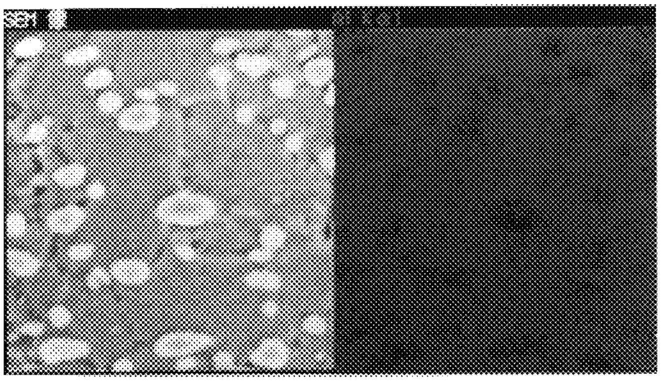
FIG. 4A–FIG. 4D show the result of a surface analysis showing locations where each element is present in the ferromagnetic portion of the composite magnetic member of the present invention.
Figure 4B:
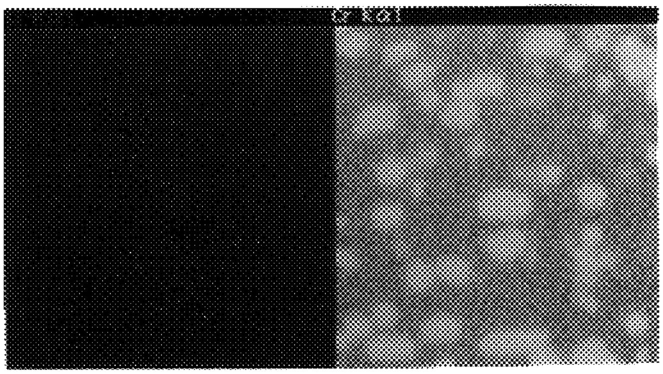
Figure 4C:
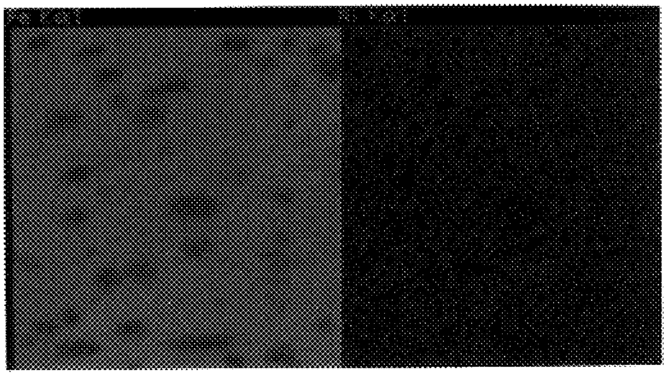
Figure 4D:
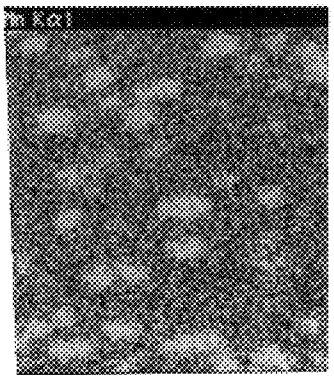

The photographs of 10 fields taken were subjected to image analysis. The number of carbides with a grain size of not less than 0.1 μm and that of carbides with a grain size of not less than 1.0 μm were counted and the proportion of the number of carbides with a grain size of not less than 1.0 μm to the total number of the former carbides per 100 $\mu m^2$ was found. As examples of observation of microstructure, FIGS. 1 to 3 show the morphology of carbides in the ferromagnetic portion of the members No. 3, No. 5 and No. 13, respectively, in one field each.

Also, FIG. 4 shows a mapping image obtained by the surface analysis of one field of the ferromagnetic portion of member No. 5 through the use of X-ray analysis. It is apparent from the result that in the structure of ferromagnetic portion mainly composed of ferrite and carbides, Cr and Mn are enriched in the carbides and that Al is present in the ferrite which is the matrix.

The grain size number of ferrite grains in the ferromagnetic portion was determined by finding the average value of 5 fields observed with an optical microscope by the ferrite grain size test method described in JIS G 0552. For the crystal orientation of the ferromagnetic portion, blocks of about 10 mm square were cut off from the ferromagnetic portion and the rolling plane was electrolytically polished, which were then analyzed by X-ray diffraction until a diffraction angle 2θ=30° to 120° was obtained, and the integrating intensity ratio of (200)/(110) was found by measuring the ferrite (110), ferrite (200) and ferrite (211).

Figure 5:
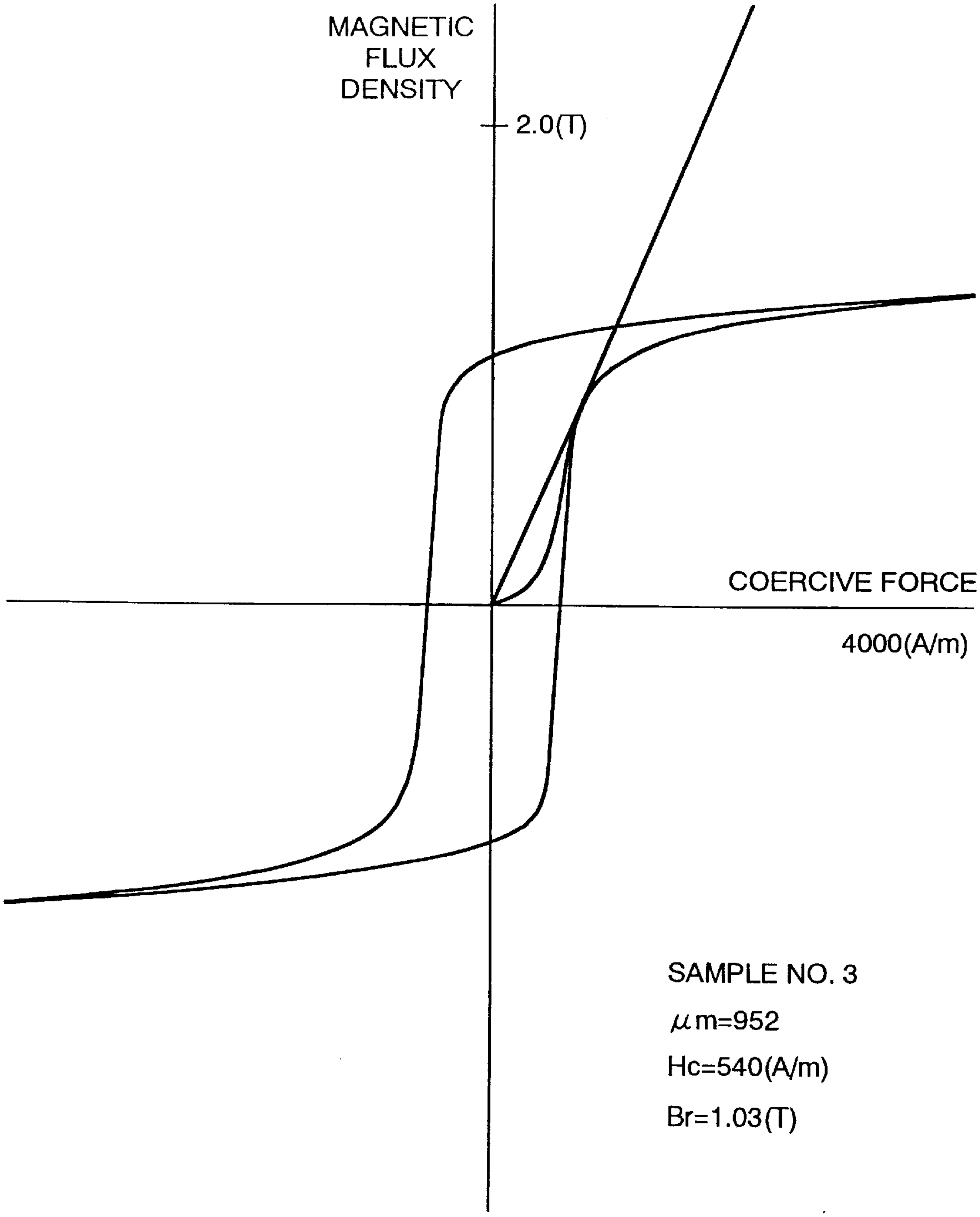
FIG. 5 shows a B-H curve of the ferromagnetic portion in the composite magnetic member of the present invention.
Figure 6:
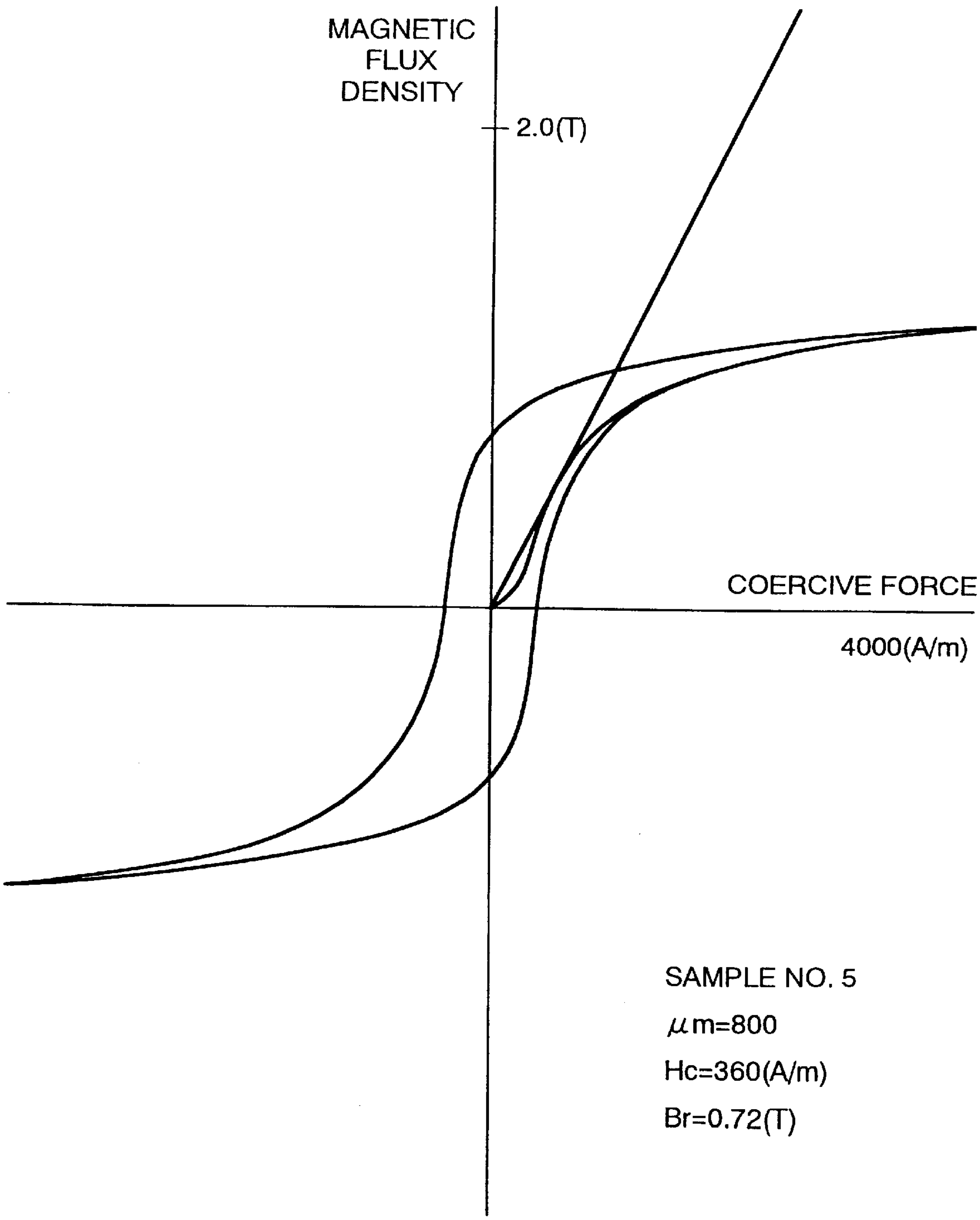
FIG. 6 shows a B-H curve of the ferromagnetic portion in the composite magnetic member of the present invention.
Figure 7:
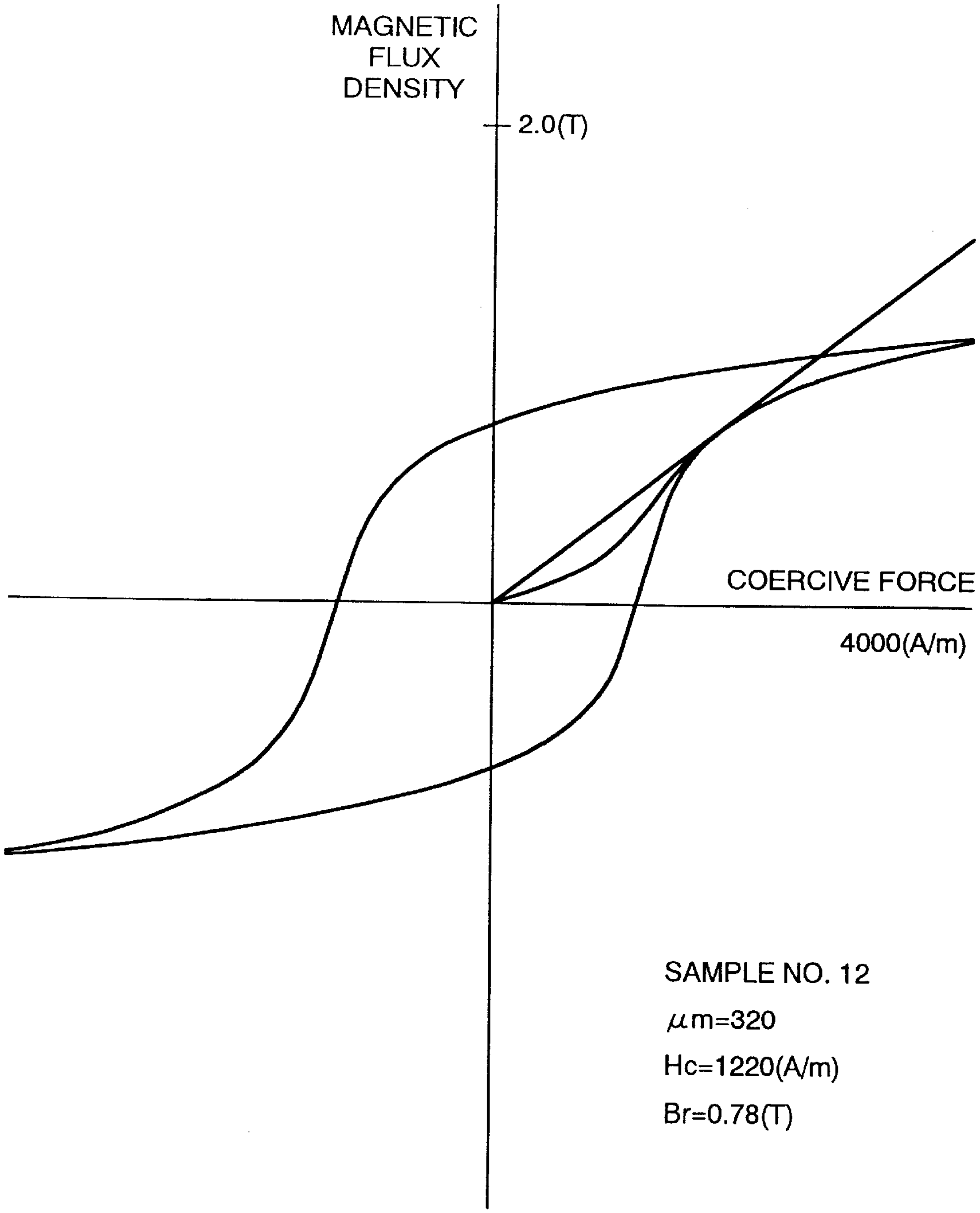
FIG. 7 shows a B-H curve of the ferromagnetic portion as a comparative example.

For the magnetic properties of the ferromagnetic portion, JIS rings each having 45 mm in outer diameter and 33 mm in inner diameter were cut off from the ferromagnetic portion. After providing a primary winding of 150 turns and a secondary winding of 30 turns, a measurement was made by applying a DC magnetic field of 4000 A/m. As measurement examples of DC magnetic properties, FIGS. 5 to 7 show the B-H curve of ferromagnetic portion of the members No. 3, No. 5 and No. 13, respectively. Furthermore, samples of 10 mm×80 mm were cut off from the ferromagnetic portion and the electrical resistivity of the ferromagnetic portion was measured.

On the other hand, blocks of about 15 mm square were cut off from the non-magnetic portion formed by high-frequency heating, and X-ray diffraction was performed after the electrolytic polishing of the surface thereof, so that it was ascertained that this non-magnetic portion was substantially composed of austenite phase. In this case, the state that the non-magnetic portion is substantially composed of the austenite phase is given by the following equation:

$$\gamma/(\alpha'+\gamma) \geqq 0.9 \qquad (1)$$

where α' is the total of the integrating intensity of peaks of martensite phase detected when scanning is performed in X-ray diffraction until a diffraction angle 2θ becomes 2θ=30° to 120° is obtained, and γ is the total of the integrating intensity of austenite phase. As a result, it was ascertained that all of the non-magnetic portions of members Nos. 1 to 13 and No. 16 satisfied the above equation (1) and that they are substantially composed of the austenite phase.

However, the above equation (1) was satisfied neither in the member No. 14 whose Al content of material is as high as 5.20% nor in the member No. 15 whose nickel equivalent of material is as low as 5.19%.

In addition, blocks of 10 mm square were cut off from the non-magnetic portion formed by high-frequency heating and the magnetic permeability of the non-magnetic portion was measured with a A-meter.

Table 2 shows the Al content and nickel equivalent of the alloy steels that are the materials for composite magnetic members, the structural morphology, soft magnetism and electrical resistivity of the ferromagnetic portion of composite magnetic member, and the magnetic permeability of the non-magnetic portion of composite magnetic member.

TABLE 2

| | Chemical composition of material (weight %) | | morphology of structure of ferromagnetic portion | | | | magnetic characteristics of ferromagnetic portion | | | electric resistivity of ferro-magnetic portion | magnetic permeability of non-magnetic portion | |
|---|---|---|---|---|---|---|---|---|---|---|---|---|
| No. | Al amount | Ni equivalent | number of carbide (piece/100 μm²) | ratio (%) of number of carbides having grain size not less than 1.0 μm to total number of all carbides | Grain size number of ferrite (JIS) | crystal orientation (200)/(110) | maximum magnetic permeability | coercive force (A/m) | residual flux density (T) | (μΩm) | | Remarks |
| 1 | 0.12 | 17.89 | 49 | 16.3 | 14.0 | 5.9 | 418 | 960 | 0.98 | 0.71 | 1.003 | the invention |
| 2 | 0.47 | 17.90 | 44 | 18.2 | 13.5 | 7.2 | 824 | 620 | 1.03 | 0.76 | 1.003 | the invention |
| 3 | 0.96 | 18.23 | 30 | 26.6 | 13.5 | 6.4 | 952 | 540 | 1.03 | 0.84 | 1.002 | the invention |
| 4 | 1.48 | 18.16 | 24 | 33.3 | 12.0 | 2.3 | 936 | 460 | 0.94 | 0.90 | 1.120 | the invention |
| 5 | 1.91 | 18.21 | 17 | 47.1 | 11.5 | 0.7 | 800 | 360 | 0.72 | 0.95 | 1.360 | the invention |
| 6 | 2.38 | 18.20 | 12 | 58.3 | 9.5 | 0.5 | 872 | 300 | 0.57 | 1.02 | 1.570 | the invention |
| 7 | 4.68 | 18.22 | 4 | 75.0 | 8.5 | 0.2 | 720 | 250 | 0.45 | 1.24 | 1.820 | the invention |
| 8 | 0.98 | 17.83 | 15 | 53.3 | 10.5 | 5.4 | 1145 | 320 | 0.85 | 0.99 | 1.120 | the invention |
| 9 | 1.03 | 9.55 | 16 | 43.8 | 13.0 | 6.3 | 958 | 510 | 1.03 | 0.81 | 1.930 | the invention |
| 10 | 1.05 | 12.21 | 21 | 38.1 | 13.0 | 6.4 | 954 | 520 | 1.01 | 0.82 | 1.220 | the invention |

TABLE 2-continued

| No. | Chemical composition of material (weight %) Al amount | Ni equivalent | morphology of structure of ferromagnetic portion: number of carbide (piece/100 $\mu m^2$) | ratio (%) of number of carbides having grain size not less than 1.0 $\mu$m to total number of all carbides | Grain size number of ferrite (JIS) | crystal orientation (200)/(110) | magnetic characteristics of ferromagnetic portion: maximum magnetic permeability | coercive force (A/m) | residual flux density (T) | electric resistivity of ferromagnetic portion ($\mu\Omega$m) | magnetic permeability of non-magnetic portion | Remarks |
|---|---|---|---|---|---|---|---|---|---|---|---|---|
| 11 | 1.03 | 21.78 | 35 | 22.9 | 13.5 | 6.3 | 947 | 560 | 1.02 | 0.84 | 1.002 | the invention |
| 12 | 1.01 | 24.45 | 41 | 19.5 | 14.0 | 6.2 | 948 | 580 | 1.02 | 0.86 | 1.001 | the invention |
| 13 | 0.02 | 19.33 | 62 | 12.9 | 16.0 | 4.4 | 320 | 1220 | 0.78 | 0.67 | 1.003 | comparative example |
| 14 | 5.20 | 18.22 | 4 | 75.0 | 8.0 | 0.2 | 670 | 220 | 0.41 | 1.31 | 2.140 | comparative example |
| 15 | 1.02 | 5.19 | 7 | 71.4 | 13.0 | 6.8 | 1080 | 160 | 0.45 | 0.81 | 2.530 | comparative example |
| 16 | 1.06 | 28.90 | 47 | 17.0 | 14.5 | 3.6 | 360 | 1380 | 0.62 | 0.87 | 1.001 | comparative example |

In Table 2, the members Nos. 1 to 12 are those of the present invention and the members Nos. 13 to 16 are comparative examples.

First, these members are discussed from the standpoint of the amount of Al added to the alloy materials, the structural morphology and soft magnetism of the ferromagnetic portion. In all of the members of the present invention Nos. 1 to 7 to which Al is added in an amount ranging from 0.1 to 5.0%, the number of carbides with a grain size of not less than 0.1 $\mu$m in the ferromagnetic portion is not more than 50 in an area of 100 $\mu m^2$ and, at the same time, the proportion of the number of carbides with a grain size of not less than 1.0 $\mu$m to the total number of the former carbides of not less than 0.1 $\mu$m in grain size is not less than 15%. In all of these members, the maximum magnetic permeability of ferromagnetic portion is not less than 400.

Furthermore, in all of the members of the present invention Nos. 1 to 7, the ferrite grains in the ferromagnetic portion are coarse grains having JIS grain size number not more than 14 and the characteristic with coercive force of not more than 1000 A/m is satisfied.

Next, the members Nos. 13 and 14 which are comparative examples are discussed. In No. 13 (Al=0.02%), because the Al content is too low, the number of carbides in the ferromagnetic portion is increased and the grains in the ferromagnetic portion are fine in size, and the maximum magnetic permeability of the ferromagnetic portion is as low as 320.

In the member No. 14 (Al=5.20%), because of the high Al content, the magnetic permeability of non-magnetic portion is 2.140 and magnetic flux flows easily although the characteristic of the ferromagnetic portion is good.

Further, in the member No. 8 containing a high content of Si, both of the micro-structure of the ferromagnetic portion and the soft magnetism thereof are improved in addition to an increase in electric resistivity.

Next, the members given in the table are discussed from the standpoint of the relationship between the C content of alloy material and the microstructure and soft magnetism of ferromagnetic portion. In the members No. 3 and Nos. 9 to 12 whose C content of material is varied, metallographic changes in the ferromagnetic portion are seen from variations in the amount of C that forms carbides. Slight changes are also observed in the soft magnetism, though they are not so remarkable as observed when the Al content is varied.

Next, the members given in the table are discussed from the standpoint of the relationship between the nickel equivalent and the maximum magnetic permeability of ferromagnetic portion and magnetic permeability of non-magnetic portion. In all of the members of the present invention Nos. 1 to 12, the characteristic with a maximum magnetic permeability of ferromagnetic portion of not less than 400 and a magnetic permeability of non-magnetic portion of not more than 2 are satisfied. In the member No. 9 with a nickel equivalent of 9.55%, the magnetic permeability of non-magnetic portion is 1.93, which value is close to the upper limit.

In the member No. 15 in which the nickel equivalent is further lower and 5.19%, the magnetic permeability of non-magnetic portion is as large as 2.53 and magnetic flux flows easily. In the member No. 16 of comparative example in which inversely, the nickel equivalent is as high as 28.90%, the maximum magnetic permeability of ferromagnetic portion is as low as 360, that is, it is apparent from this that the soft magnetism thereof deteriorates.

It is apparent from the above results that the preferred range of nickel equivalent is from 10.0 to 25.0%.

EXAMPLE 2

In the present invention, the hot working temperature of an Al-containing Fe—Cr—C-base alloy steel that is used as the material in the manufacturing process of composite magnetic members is also important. Therefore, in composite magnetic members obtained when the hot working temperature of an alloy steel used as the material for the member No. 3 shown in Table 1 was varied in the range of 950 to 1150° C., the number of carbides with a grain size of not less than 0.1 $\mu$m in the ferromagnetic portion and the number of carbides with a grain size of not less than 1.0 $\mu$m were measured. The same method of measuring the number of carbides as mentioned in Example 1 was adopted. The results of the measurement are shown in 3.

TABLE 3

| No. | hot working temper-ature (° C.) | number of carbides in ferro-magnetic portion (pieces/ 100 $\mu m^2$) | ratio (%) of number of carbides having grain size not less than 1.0 $\mu$m to the total number of all carbides | Remarks |
|---|---|---|---|---|
| 101 | 950 | 19 | 42.1 | the invention |
| 102 | 1000 | 30 | 26.6 | the invention |
| 103 | 1050 | 39 | 20.5 | the invention |
| 104 | 1100 | 47 | 17.0 | the invention |
| 105 | 1150 | 58 | 13.8 | comparative example |

It is apparent from Table 3 that by using a hot working temperature not higher than 1100° C. for an alloy steel used as the material, it is possible to obtain the composite magnetic member of the present invention in which the number of carbides with a grain size of not less than 0.1 $\mu$m in the ferromagnetic portion is not more than 50 in an area of 100 $\mu m^2$ and in which the proportion of the number of carbides with a grain size of not less than 1.0 $\mu$m to the total number of the former carbides is not than 15%.

According to the present invention, in a composite magnetic member having a ferromagnetic portion and a non-magnetic portion, by using an Fe—Cr—C-base alloy steel to which Al is added in an amount ranging from 0.1 to 5.0% as a single material for this member and by performing hot working and annealing in appropriate temperature ranges, it is possible to obtain a ferromagnetic body in which the number of carbides with a grain size of not less than 0.1 $\mu$m in the ferromagnetic portion is not more than 50 in an area of 100 $\mu m^2$ and in which the proportion of the number of carbides with a grain size of not less than 1.0 $\mu$m to the number of the former carbides is not less than 15% and further it is possible to obtain a stable non-magnetic portion having the same magnetic properties as with conventional members. The present invention provides a technique indispensable for the application of a composite magnetic member to a magnetic circuit requiring excellent soft magnetism.

What is claimed is:

1. A composite magnetic member made of an Fe—Cr—C-base alloy steel containing 0.1 to 5.0 weight % Al, comprising a ferromagnetic portion with a maximum magnetic permeability of not less than 400 and a non-magnetic portion with a magnetic permeability of not more than 2, said ferromagnetic portion being provided with carbides so that a number of carbides with a grain size of not less than 0.1 $\mu$m is regulated to not more than 50 in an area of 100 $\mu m^2$ and so that a proportion of the number of carbides with a grain size of not less than 1.0 $\mu$m to the number of said carbides of not less than 0.1 $\mu$m in grain size in an area of 100 $\mu m^2$ is regulated to be not less than 15%.

2. A composite magnetic member made of an Fe—Cr—C-base alloy steel containing 0.1 to 5.0 weight % Al, comprising a ferromagnetic portion with coercive force of not more than 1000 A/m and a non-magnetic portion with a magnetic permeability of not more than 2, said ferromagnetic portion being regulated to have coarse grains having JIS grain size number not more than 14.

3. A composite magnetic member according to claim 1 or 2, wherein said ferromagnetic portion has an X-ray integrating intensity ratio of ferrite (200) to ferrite (110) of not less than 6 when crystal orientation is measured from a surface side thereof with X-rays.

4. A composite magnetic member according to claim 1 or 2, wherein said ferromagnetic portion has an electrical resistivity of not less than 0.7 $\mu\Omega$m.

5. A composite magnetic member according to any one of claim 1 or 2, wherein said composite magnetic member is made of an alloy steel with a nickel equivalent of 10.0 to 25.0% which nickel equivalent is defined by a formular of % Ni+30×% C+0.5×% Mn+30×% N.

6. A composite magnetic member according to claim 1 or 2, wherein said composite magnetic member is made of an alloy steel having a chemical composition consisting essentially, by weight, of 0.30 to 0.80% C, 12.0 to 25.0% Cr, 0.1 to 5.0% Al, 0.1 to 4.0% Ni, 0.01 to 0.10% N, at least one element selected from the group consisting of Si and Mn in an amount not more than 2.0% in total, and the balance Fe and incidental impurities.

7. A composite magnetic member according to claims 1 or 2, wherein said composite magnetic member contains 0.3 to 3.5% Al by weight.

8. A method of producing a ferromagnetic portion of a composite magnetic member, comprising the steps of hot working an Fe—Cr—C-base alloy steel containing 0.1 to 5.0 weight % Al at a temperature not more than 1100° C., annealing said alloy steel at least once at a temperature not more than A3 transformation point so that said ferromagnetic portion is obtained in which a number of carbides with a grain size of not less than 0.1 $\mu$m is regulated to not more than 50 in an area of 100 $\mu m^2$ and in which a proportion of the number of carbides with a grain size of not less than 1.0 $\mu$m to the number of said carbides of not less than 0.1 $\mu$m in grain size in an area of 100 $\mu m^2$ is regulated to not less than 15%.

9. A method of forming a non-magnetic portion of a composite magnetic member, comprising the steps of hot working an Fe—Cr—C-base alloy steel containing 0.1 to 5.0 weight % Al at a temperature not higher than 1100° C., annealing said alloy steel at least once at a temperature not higher than A3 transformation point so that said ferromagnetic portion is obtained in which a number of carbides with a grain size of not less than 0.1 $\mu$m is regulated to not more than 50 in an area of 100 $\mu m^2$ and in which a proportion of another number of carbides with a grain size of not less than 1.0 $\mu$m to the number of carbides of not less than 0.1 $\mu$m in grain size in an area of 100 $\mu m^2$ is regulated to not less than 15%, heating a part of said ferromagnetic portion in a temperature range of 1050° C. to the melting point, and cooling said heated part so that said non-magnetic portion is obtained.

* * * * *